United States Patent [19]

Knoerzer

[11] Patent Number: 4,647,807

[45] Date of Patent: Mar. 3, 1987

[54] ROTATING COLLECTOR ASSEMBLY FOR ELECTRICAL MACHINES

[75] Inventor: Karl-Heinz Knoerzer, Vogtsburg/Achkarren, Fed. Rep. of Germany

[73] Assignee: Kollektor GmbH, Bad Krozingen, Fed. Rep. of Germany

[21] Appl. No.: 784,681

[22] Filed: Oct. 4, 1985

[30] Foreign Application Priority Data

Nov. 27, 1984 [DE] Fed. Rep. of Germany ....... 3443107

[51] Int. Cl.[4] ...................... H02K 13/00; H01R 39/16; H01R 43/06

[52] U.S. Cl. ...................................... 310/236; 310/233

[58] Field of Search ............... 310/233, 235, 236, 231, 310/42, 216, 234, 219

[56] References Cited

U.S. PATENT DOCUMENTS 2,297,521 9/1942 Zadnik ................................ 310/236

FOREIGN PATENT DOCUMENTS 1034262 7/1958 Fed. Rep. of Germany ...... 310/233

*Primary Examiner*—Patrick R. Salce
*Assistant Examiner*—D. L. Rebsch
*Attorney, Agent, or Firm*—Staas and Halsey

[57] ABSTRACT

A collector includes a carrier bushing, onto which a rim of collector segments is attached by means of swallowtail-type attachment devices. An intermediate space remaining between the carrier bushing and the collector segments is filled with a casting material. An interlocking swallowtail arrangement is used, which fixes the collector segments radially to the carrier bushing in such a way that they cannot come loose. The carrier bushing has a T-profile groove, into which the collector segments can be inserted and pushed onto the carrier bushing in the circumferential direction. After the collector segments have been installed, the T-profile groove is closed with a wedge, which also has a swallowtail structure to hold the single remaining collector segment.

6 Claims, 3 Drawing Figures

ROTATING COLLECTOR ASSEMBLY FOR ELECTRICAL MACHINES

The invention concerns a collector for electrical machines.

A known collector of this type has a carrier bushing, on whose outer mantle dovetail or swallowtail-type attachment devices which extend in the circumferential direction are provided. On this carrier bushing, collector segments are attached by means of complementary, swallowtail-type attachment devices. The collector segments each extend in an axial direction, and they form a rim of segments around the carrier bushing, with adjacent collector segments being electrically insulated from one another. The swallowtail-type attachment devices are designed in such a way that an intermediate space remains between the carrier bushing and the collector segments. This intermediate space is filled with a casting material, for example a fiber-reinforced epoxy resin. The casting material connects the collector segments with the carrier bushing, and, when hardened, forms an insulating layer between the carrier bushing and the collector segments.

In the known collector, the swallow tail-type attachment devices on the carrier bushing and the collector segments are selected in such a way that the collector segments can be attached to the carrier bushing radially from the outside. This is done by having swallowtails on the collector segments fit through the neck-type constrictions of swallowtail openings in the carrier bushing, and in the same manner, having swallowtails on the carrier bushing fit through the neck-type constrictions of swallowtail openings in the collector segments. When the rim of segments is installed, swallowtails do fit into swallowtail openings, but the swallowtail structure does not mesh. A rigid connection between the carrier bushing and the rim of segments is not formed until the gap remaining between the two is filled with the casting material.

With this type of construction, it is true that the segments can be radially attached to the carrier bushing. But the casting material located between the segments and the carrier bushing is also under tensile stress during operation. For reasons of stability, the circumferential velocity of the known collector is therefore restricted to approximately 40 meters per second.

Modern drive technology, however, demands more revolutions per minute for many electrical machines, and also the possibility of operation at higher temperatures, in order to achieve greater output while maintaining the structural size, and to be able to eliminate intermediate gears in many cases. This requirement can not be met with the known collector.

It is the task of the invention to create a collector which is simple in its design and which can be produced economically, and which makes it possible, under high thermal load, to achieve increased circumferential velocities aided by good air cooling.

This goal is achieved with a collector of the stated type, with an intermeshing swallowtail arrangement between the carrier bushing and the collector segments, in which the neck of each swallowtail opening is so narrow that the end of each swallowtail which is fitted into it can not fall out.

According to the invention, the swallowtail-type attachment devices on the carrier bushing and the collector segments therefore mesh together, but of course a gap remains between these parts, and this is filled with casting material. Although it is no longer possible to attach the collector segments directly radially to the carrier bushing, what is achieved is that the adjacent surfaces of the complementary, swallowtail-type attachment devices are almost all parallel to one another. The casting material located between the adjacent surfaces is therefore subject only to pressure stress, and circumferential velocities of the collector of up to 70 m/s can be achieved, with a minimum eccentricity of the collector surface. Also, any convex tension which was built up in the interlocking segments before the casting material was introduced can be fully maintained.

Another advantage of the construction according to the invention is the slight amount of radial space needed to anchor the segments, independent of the total length of the collector. This makes it possible to provide large ventilation openings in the carrier bushing, and thanks to the improved cooling possibilities, the thermal load capacity of the collector is improved. At the same time, the weight of the collector can be significantly reduced.

An important area of application for the collector according to the invention is drive motors for means of transportation which run on rails, which are designated as traction machines. For these machines, screw collectors were almost exclusively used until now, but there are disadvantages, such as, great weight, high manufacturing costs, a low ventilation capacity, etc. Here, the invention yields significant improvements.

In a preferred further development of the invention, the carrier bushing has a radial slit in the area of the swallowtail-type attachment devices, so that the collector segments can be inserted into the slit and pulled onto the carrier bushing in a circumferential direction. Since a radial attachment of the collector segments is no longer possible, an easy to install connection between the carrier bushing and the collector segments, is created in this way.

The invention further provides that the slit in the carrier bushing be closed by means of a wedge, which has a swallowtail arrangement, corresponding to the carrier bushing. By wedging the slit shut, the collector segments are connected with the carrier bushing in such a way that they can not come loose, thus meeting the safety requirements at very high circumferential velocities. The swallowtail arrangement at the wedge makes it possible to attach a collector segment with the same shape and size as the ones used on the circumference of the remainder of the carrier bushing in the wedge area. In this way, a cost-effective, modular structure with only a few different parts is achieved.

The invention further provides that the wedge is held in place by the casting material, after the collector is finished. The casting material therefore takes on an additional function, aside from fixing the collector segments in place and insulating them, in a manner that does not require a complicated design.

According to another embodiment of the invention, the slit in the carrier bushing is shaped in the form of a T-groove, and the wedge has a complementary T-profile. With an orientation of the T-base in the circumferential direction, i.e. with the T-shaft in the radial direction, an excellent transfer to the carrier bushing of the centrifugal forces acting on the wedge is achieved, which is desirable for safety reasons.

In particular, the T-shaft of the wedge can have a width which exactly corresponds to the thickness of one collector segment. This makes the collector easy to install. All the segments except one can be attached to the carrier bushing, and the last segment can be driven in together with the wedge, which simultaneously closes the slit in the carrier bushing and the segment rim.

According to another embodiment of the invention, the carrier bushing and the collector segments can be intermeshed in a meander structure, in which swallowtails of equal size and at equal axial intervals on the carrier bushing and the collector segment mesh into swallowtail openings, also of equal size relative to one another, located between them, which have a gap that must be filled with casting material and which has a more or less constant width throughout, remaining between the carrier bushing and the collector segment. This meander-shaped intermeshing provides uniform transfer of forces, and the surface stress of the casting material is more or less constant throughout.

The invention, finally, is not restricted to a swallowtail form of the intermeshing between the carrier bushing and the collector segments. Rather, other interlocking devices for rigid connections with grooves which have a neck-type constriction, and with complementary ends which fit into the grooves can be provided, where the ends do not fit through the constriction.

The invention is explained in greater detail below, using a preferred embodiment shown in the diagrams.

Figure 1:
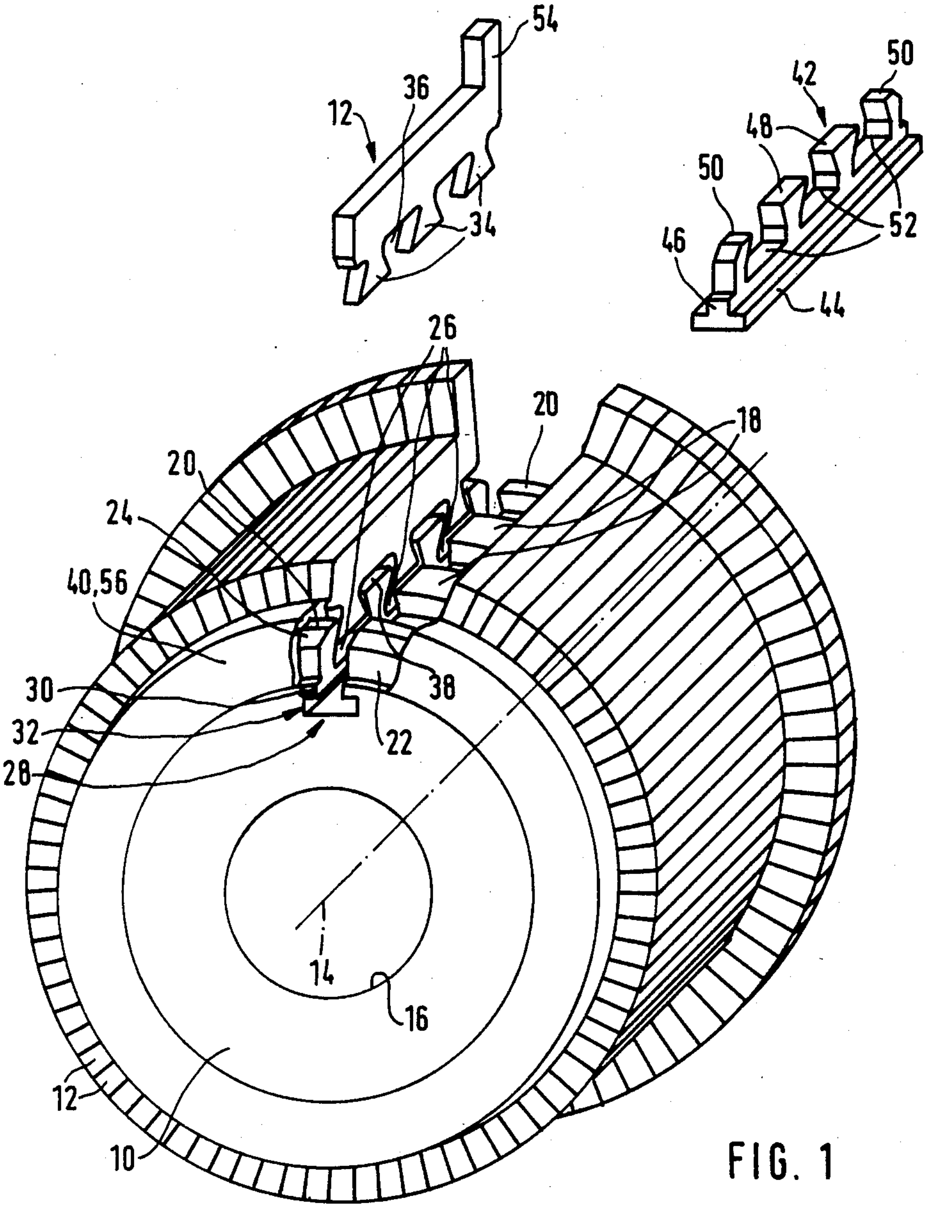
FIG. 1 is a perspective view of a collector according to the present invention with the casting material partially broken away, the wedge pulled out and one individual collector segment.

With reference to FIG. 1, the collector shown consists of a carrier bushing 10 and a rim of collector segments 12 pulled onto the carrier bushing 10 in the circumferential direction. This rim is partially broken up, so that the orientation of the collector segments 12 becomes visible. The carrier bushing 10 has the basic shape of a circular cylinder. Its center axis 14 represents the rotational axis of the collector. In the vicinity of this rotational axis 14, the carrier bushing 10 includes a collector hub, which is indicated by a central, axial cylinder bore 16 in the embodiment shown. The collector hub can have any other desired shape, however, and can be formed, e.g., as a guide bushing mounted in a cross, a cloverleaf opening, etc. (not shown). The collector rests with its hub on the shaft of an electrical machine, such as e.g. an electromotor, a generator or a transformer.

On the outer mantle of the carrier bushing 10 there are attachment devices for the collector segments 12 in the form of crosspieces 18, 20, which extend in the circumferential direction. According to FIG. 1, four parallel crosspieces 18, 20 are provided at axial intervals. The two center crosspieces 18 have a swallowtail shape in their cross-section, and widen radially in an outward direction. The outer crossieces 20, in contrast, have the cross-sectional shape of a swallowtail cut in half in a median plane, and they are additionally cut at a slant in the area of their ends, so that the axial front surfaces 22 of the carrier bushing 10 have a circumferential bevel 24 radially on the outside.

Between crosspieces 18, 20 on the outer mantle of carrier bushing 10, there are ring grooves 26 disposed in the circumferential direction. Their groove openings also have a swallowtail-shaped cross-section, and they widen radially from the outside to the inside. The groove openings are wider and deeper than the swallowtail-shaped crosspiece 18.

Furthermore, the outer mantle of the carrier bushing 10 has slits, forming a T-profile groove 28. The T-profile groove 28 extends in an axial direction along the entire length of the carrier bushing 10. The foot opening 30 of the T-profile groove 28 is radially oriented, and intersects the carrier bushing 10 at a depth that is greater than that of the swallowtail-type attachment devices 18, 20. This means that the latter are interrupted by the foot opening 30. The width of the foot opening 30 is selected in such a manner that a single collector segment 12 can be introduced into it and pulled onto the carrier bushing 10 in the circumferential direction. Radially within crosspieces 18, 20 and the ring grooves 26 of the carrier bushing 10, the foot opening 30 widens to form a head opening 32 of the T-profile groove 28, which is recessed in the solid material of the carrier bushing, more or less oriented in the circumferential direction.

The collector segments 12 are circular cylinder segments, with essentially the same axial length as the carrier bushing 10. They are preferably made of copper and are attached in a rim on the outer mantle of the carrier bushing 10, so that they are insulated from one another and from the carrier bushing 10. The collector segments 12 have swallowtail-type attachment devices on their radial inner edge for this purpose; these intermesh with the ones on the carrier bushing 10. In detail, three swallowtails 34 which project from the radial inner edge of the collector segment 12 can be seen; there are two swallowtail openings 36 between them. The latter are again larger than the swallowtails 34. In the installed state, the swallowtails 34 of the collector segments 12 come to rest in the ring grooves 26 of the carrier bushing 10, and the crosspieces 18, 20 mesh into the swallowtail openings 36 of the collector segments 12. The carrier bushing 10 and the collector segments 12 do not touch one another when this happens. Instead, a gap 38 remains between the swallowtail structures, and this is filled with a casting material 40.

According to the invention, an interlocking swallowtail arrangement is provided, in which the neck of each swallowtail opening 26, 36 is so narrow that the end of each swallowtail 18, 34 which comes to rest therein does not fit through the constriction. The collector segments 12 can therefore not simply be attached radially onto the carrier bushing 10. Instead, they are introduced into the T-profile groove 28 and then threaded onto the carrier bushing 10 in the circumferential direction, with the swallowtail structures intermeshing with one another. The collector segments 12 are thereby anchored to the carrier bushing 10 in the radial direction, in such a way that they can not come loose.

When the carrier bushing 10 is almost completely equipped with collector segments 12, the T-profile groove 28 is closed. For this, a T-profile wedge 42 which fits into the T-profile groove 28 is used. The axial length of the wedge 42 approximately corresponds to that of the carrier bushing 10. The wedge 42 has a crossbeam 44, which comes to rest in the head opening 32 of the T-profile groove 28. Correspondingly, a base crosspiece 46 of the wedge 42 fits into the foot opening 30 of the T-profile groove 28, in order to close it.

The base crosspiece 46 has a swallowtail-shaped profile, thereby forming a holding structure which perfectly correponds to that on the outer mantle of the carrier bushing 10. There are present, therefore, two more central swallowtails 48 and two lateral half-swallowtails 50, with three larger swallowtail openings 52 located between them. When the wedge 42 is set in place, these swallowtail structures are flush with those of the carrier bushing 10 in the circumferential direction. Therefore, a collector segment 12 can be pulled onto the base crosspiece 46, and this segment will completely correspond in structure to the other collector segments 12 used. The thickeness of the base crosspiece 46 corresponds to that of one collector segment 12, i.e. it is slightly larger, allowing for installation play. When all the collector segments 12 except for one have been attached to the carrier bushing 10, the last collector segment 12 is set onto the wedge 42, and the latter is driven into the T-profile groove 28, which at the same time closes the rim of collector segments 12. Then the casting material 40 is introduced in a molding process, and this closes the gap 38 between the carrier bushing 10 and the collector rim. The collector segments 12 shown in FIG. 1 have a radially projecting connection lug 54 at their axial end. The presence of such a lug is not required for the invention, however. Adjacent collector segments 12 can be insulated from one another with mica, for example. As casting material 40, such as a fiber reinforced epoxy resin combination without asbestos fillers, which is resistant to creep current, is particularly suitable.

Figure 2:
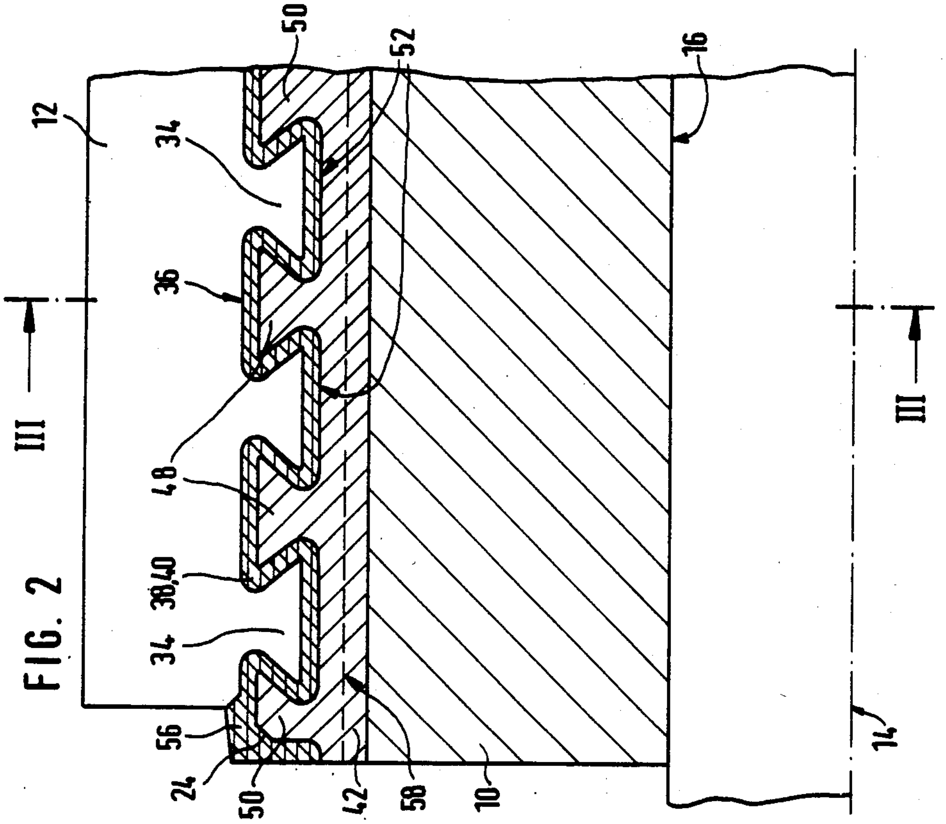
FIG. 2 is a longitudinal section through the completely installed collector in a median plane through the wedge and hitting the rotational axis of the collector, following the line II—II in FIG. 3.

FIG. 2 shows the interlocking obtained between the carrier bushing 10 and the segment rim 12. First of all, one should note again the interlocking intermeshing of the swallowtails, which makes radial loosening of the collector segments 12 impossible, even without the addition of the casting material 40. The carrier bushing 10 and the collector segments 12 are intermeshed in a meander structure. The swallowtails 18, 34, 48 on the carrier bushing 10, i.e. the wedge 42 and collector segments 12 are of equal size, and they are located at equal axial intervals. In the same way, the swallowtail openings 26, 36, 52 of the carrier bushing 10, i.e. the wedge 42 and collector segments 12 are also of equal size relative to one another, and located at equal axial intervals, and, as mentioned, they are larger than the swallowtails 18, 34, 48 which fit into them. The contours of the swallowtails and the swallowtail openings are the same, so that a gap 38, with a more or less constant width throughout, remains between the carrier bushing 10 and the segment rim 12. The casting material 40 filled into this gap therefore forms a layer with an approximately constant thickness throughout. In its hardened state, it holds the segment rim onto the carrier bushing and simultaneously forms an electrical insulation between the carrier bushing 10 and the individual collector segments 12. In operation, the casting material layer located between the flanks of the swallowtail structure is primarily under pressure stress, due to the centrifugal forces acting on the collector segments 12. The casting material can absorb significant pressure forces, so that higher circumferential velocities at the collector mantle can be handled with the invention.

For this, the attachment devices do not necessarily have to have a swallowtail shape. Instead, other interlocking rigid attachment devices can be used, which have grooves with neck-type constrictions as well as complementary ends which fit into the grooves, where the ends do not fit through the neck-type constrictions.

As can be seen in FIG. 2 on the left, the carrier bushing 10 projects beyond the collector segment rim 12 in the axial direction. It is recommended that casting material 56 also be applied in the area of this projection, in order to create a flush front surface in this way. In the embodiment shown, the entire half-swallowtail 20 is imbedded in casting material 56.

It is understood that the invention is not restricted to the number of swallowtail openings and swallowtails intermeshing with them as shown in FIG. 1. Rather, depending on the axial length of the collector, a number of swallowtails adapted to this length can be used. The form of attachment according to the invention is therefore suitable for all possible structural sizes, and is very flexible in this respect.

Figure 3:
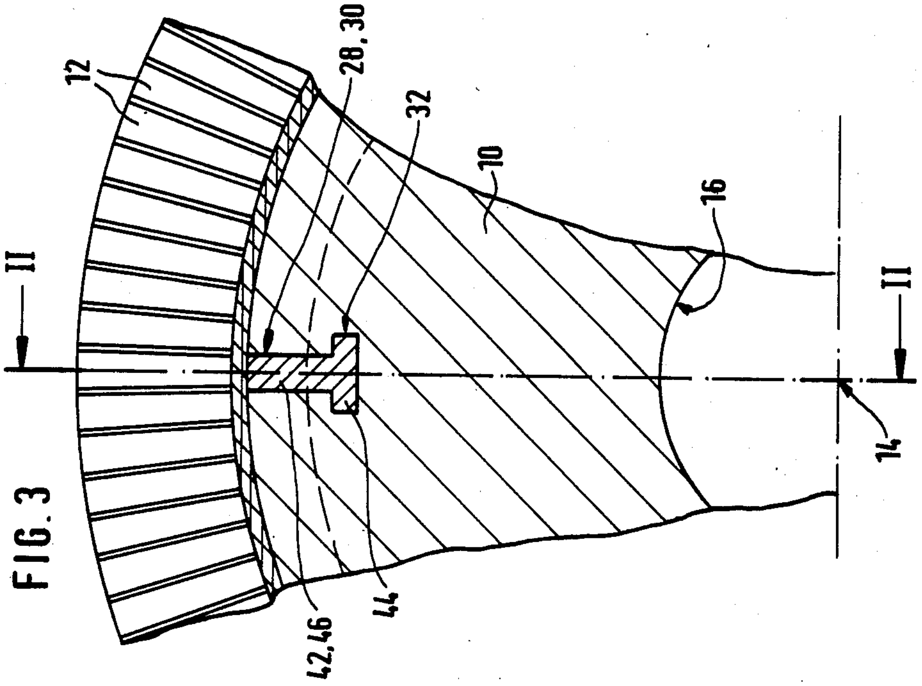
FIG. 3 shows a cross-section through the collector in a radial plane, following the line III—III in FIG. 2.

The section in FIG. 2 is through wedge 42. The step at which the crossbeam 44 attaches to the base crosspiece 46 can therefore be recognized as the covered edge 58. The position of the section is shown in more detail in FIG. 3.

The slight thickness should be noted of the casting material layer 40, which is sufficient to create a perfect connection between the carrier bushing 10 and the collector segments 12. The thin plastic layer makes good heat exchange possible, and prevents undesirable thermal stress. The close intermeshing of the collector segments with the carrier bushing, with an exactly defined distance, forms a mechanical connection of great strength. A further advantage of this type of construction is the slight amount of radial space required to anchor the segments, independent of the total axial length. This makes it possible to provide large ventilation openings in the carrier bushing, i.e. the collector hub, with extensive freedom as far as the shape is concerned. This results in better cooling, i.e. greater output, particularly for applications in motors cooled by flow-through ventilation.

The uniform distribution of the centrifugal forces over the entire collector length makes a low segment height possible, even at extreme circumferential velocities. The collector according to the invention is characterized by very good dielectrical properties. It has a great insulation resistance, independent of the temperature, and can be produced particularly in insulation classes F and H. For the total size, a diameter range of 70 to 500 mm and a total axial length of 15 to 450 mm are being considered, but the manufacture of larger or smaller collectors is certainly possible. Overall, a molding material collector for increased circumferential velocities and a greater thermal load capacity, with good air cooling possibilities and economic prodution at the same time, is achieved in this way.

What is claimed is:

1. A collector for electrical machines, comprising:

a carrier bushing mounted coaxially on an integral hub, said carrier bushing having an outer mantle on which are provided first, swallowtail-type attachment devices which extend in the circumferential direction and collector segments which can be attached to the carrier bushing by means of second, complementary, swallowtail-type attachment devices, with an intermediate space remaining between the carrier bushing and the collector segments, which can be filled with a casting material, wherein the first and second swallowtail-type attachment devices have an intermeshing swallowtail arrangement in which a neck of each swallowtail-type opening is so narrow that a corresponding swallowtail-type end which is fitted into each neck opening does not fit through, and wherein the carrier bushing has a longitudinal slit in the area of the first, swallowtail-type attachment devices, so that the collector segments can be inserted into the slit and pulled onto the carrier bushing in the circumferential direction.

2. A collector for electrical machines, comprising:

a carrier bushing having an outer mantle on which are provided first swallowtail-type attachment devices which extend in the circumferential direction and collector segments which can be attached to the carrier bushing by second, swallowtail-type attachment devices, with an intermediate space remaining between the carrier bushing and the collector segments, which can be filled with a casting material, wherein the first and second swallowtail-type attachment devices have an intermeshing swallowtail arrangement in which a neck of each swallowtail-type opening is so narrow that a corresponding swallowtail-type end which is fitted into the neck opening does not fit through, wherein the carrier bushing has a longitudinal slit in the area of the first swallowtail-type attachment devices so that the collector segments can be inserted into the slit and pulled onto the carrier bushing in the circumferential direction, and wherein a wedge is provided with a swallowtail-type arrangement corresponding to that of the carrier bushing to close the slit.

3. A collector according to claim 2, wherein the wedge is held in place by the casting material after the collector is assembled.

4. A collector according to claim 3, wherein the slit in the carrier bushing has a T-profile, and wherein the wedge has a complementary T-profile.

5. A collector according to claim 4, wherein the shaft of the T of the wedge has a width which exactly corresponds to the thickness of one collector segment.

6. A collector according to claim 5, wherein the carrier bushing and the collector segments are intermeshed with one another in a meander structure, in which the swallowtails ends are of equal size and located at equal axial intervals on the carrier bushing and the collector segments, and mesh into the swallowtail neck openings also of equal size relative to one another, located between them, with a gap, which must be filled with casting material and which has a substantially constant width throughout, remaining between the carrier bushing and the collector segments.

* * * * *